(12) United States Patent
Karlberg et al.

(10) Patent No.: US 11,966,485 B2
(45) Date of Patent: Apr. 23, 2024

(54) PROPERTY-LEVEL VISIBILITIES FOR KNOWLEDGE-GRAPH OBJECTS

(71) Applicant: MICROSOFT TECHNOLOGY LICENSING, LLC, Redmond, WA (US)

(72) Inventors: Jan-Ove Almli Karlberg, Tromso (NO); Tor Kreutzer, Tromso (NO); Andrei-Alin Corodescu, Oslo (NO); Vidar Tveoy Knudsen, Oslo (NO); Bernt Lervik, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 17/343,498

(22) Filed: Jun. 9, 2021

(65) Prior Publication Data
US 2022/0398331 A1    Dec. 15, 2022

(51) Int. Cl.
G06F 21/62    (2013.01)
G06N 5/02    (2023.01)

(52) U.S. Cl.
CPC .......... *G06F 21/6209* (2013.01); *G06N 5/02* (2013.01)

(58) Field of Classification Search
CPC ...... G06F 21/6209; G06F 21/00; G06F 21/60; G06F 16/245; G06N 5/02; G06Q 50/01
USPC .......................................................... 726/27
See application file for complete search history.

(56) References Cited

U.S. PATENT DOCUMENTS

| 9,940,472 B2 | 4/2018 | Akkiraju et al. |
| 2008/0082538 A1* | 4/2008 | Meijer ............... G06F 21/6218 707/999.009 |
| 2013/0191416 A1* | 7/2013 | Lee ..................... G06F 16/2457 707/771 |
| 2014/0258236 A1* | 9/2014 | Vijayan ................ G06F 16/116 707/674 |

(Continued)

FOREIGN PATENT DOCUMENTS

EP    2894587 A1    7/2015

OTHER PUBLICATIONS

Hult, et al., "Customizing item insights privacy in Microsoft Graph (preview)", Retrieved from: https://docs.microsoft.com/en-us/graph/insights-customize-item-insights-privacy?view=graph-rest-1.0, Dec. 1, 2020, 6 pages.

(Continued)

Primary Examiner — Tae K Kim
(74) Attorney, Agent, or Firm — Holzer Patel Drennan

(57) ABSTRACT

The technology described herein protects the privacy and security of data stored in a knowledge graph ("graph") by enforcing visibility policies when returning property information in response to a query or other attempt to extract property information from the graph and/or about the graph. The visibility policies may be stored with the object and used to prevent restricted properties from being extracted from the object, let alone the graph. The object-specific visibility policy may be stored in the storage layer of the knowledge-graph object with the object properties and content. Some implementations may include multiple visibility records for a single object. Together the visibility records form the object visibility policy. An object visibility policy may have a single visibility record or multiple visibility records.

20 Claims, 9 Drawing Sheets

(56) References Cited

U.S. PATENT DOCUMENTS

| | | |
|---|---|---|
| 2015/0193636 A1* | 7/2015 | Snelling .............. G06F 21/6218 |
| | | 726/28 |
| 2015/0249669 A1 | 9/2015 | Gamage |
| 2016/0203327 A1 | 7/2016 | Qiao et al. |
| 2017/0091470 A1 | 3/2017 | Infante-Lopez |
| 2017/0286481 A1 | 10/2017 | Raina et al. |
| 2019/0251272 A1* | 8/2019 | Ravizza ............ G06F 18/23213 |
| 2019/0266336 A1* | 8/2019 | Scheideler .......... G06F 21/6218 |
| 2020/0134477 A1* | 4/2020 | Lee ........................ G06N 5/022 |
| 2021/0029074 A1 | 1/2021 | Buck et al. |
| 2021/0081550 A1* | 3/2021 | Raphael .............. G06F 21/6218 |
| 2021/0168150 A1 | 6/2021 | Ross et al. |
| 2022/0318426 A1* | 10/2022 | Solheim .............. G06F 21/6245 |

OTHER PUBLICATIONS

"International Search Report and Written Opinion Issued in PCT Application No. PCT/US22/028649", dated Aug. 1, 2022, 12 Pages.
"International Search Report and Written Opinion Issued in PCT Application No. PCT/US22/020281", dated Jun. 8, 2022, 10 Pages.
"Non-Final Office Action Issued in U.S. Appl. No. 17/320,368", dated Mar. 22, 2023, 30 Pages.
Khan, et al., "SAFE: SPARQL Federation over RDF Data Cubes with Access Control", in Journal of Biomedical Semantics, vol. 8, Feb. 1, 2017, 22 Pages.
"Advisory Action Issued in U.S. Appl. No. 17/320,368", dated Sep. 15, 2023, 4 Pages.
"Final Office Action Issued in U.S. Appl. No. 17/320,368", dated Jun. 29, 2023, 35 Pages.

\* cited by examiner

```
QUERY: PROB A, PROB C, PROB M     ~510
REQUESTOR: USER B
```

```
REQUESTED: {1, 3, 13}             ~512A
```

```
GRANTED: {}                       ~514A
```

*FIG. 5A.*

```
REQUESTED: {3, 13}                ~512B
```

```
GRANTED: {1}                      ~514B
```

*FIG. 5B.*

```
REQUESTED: {13}                   ~512C
```

```
GRANTED: {1, 3}                   ~514C
```

*FIG. 5C.*

```
REQUESTED: {13}                   ~512D
```

```
GRANTED: {1, 3}                   ~514D
```

*FIG. 5D.*

PROPERTY-LEVEL VISIBILITIES FOR KNOWLEDGE-GRAPH OBJECTS

CROSS-REFERENCE TO RELATED APPLICATIONS

None.

BACKGROUND

Data visibility is an important issue for users and organizations alike. Generally, access to objects (e.g., documents, files, folders, accounts, emails) may be managed effectively. However, managing visibility to properties of these objects is challenging. Users and organizations generally lack the ability to control the use of personal and organizational information contained in object properties in a granular and dynamic way. Some of the challenges around managing visibility controls are caused by how control information is stored in graph forms.

For efficient retrieval and analysis, organizational information may be stored in a knowledge graph (e.g., information graph). Knowledge graphs may contain multiple objects that have relationships with one another. The objects may include nodes and edges. The nodes may represent an entity. An entity may broadly be defined as a named noun or a named object. Nodes may be organized by entity-type. Entity-types could include, for exemplary purposes only, a person, a location, a place, a business, an organization, a movie title, a book, a song, etc. There are many examples of entity-types, and this list is intended to be a non-exhaustive list of exemplary entity-types. Relationships connect the nodes and form the graph "edges." For example, nodes instances within the "document" entity-type could be connected to the "person" entity-type node by the relationship "author."

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technology described herein protects the privacy and security of data stored in a knowledge graph ("graph") by enforcing visibility policies when returning property information in response to a query or other attempt to extract property information from the graph and/or about the graph. The visibility policy may be enforced against properties of knowledge-graph objects, which include nodes and edges.

A visibility policy may govern read-access to a property of a knowledge-graph object. In one aspect, property visibilities are managed at the object level. In other words, the visibility policy for an object property may be enforced during the process of extracting information from the object. The visibility policies may be stored with the object and used to prevent restricted properties from being extracted from the object, let alone the graph. This is in contrast to conventional methods that may attempt to enforce visibility policies at the information ingestion process or through another service-level process after information is output from the graph.

The technology described herein minimizes usage of computer resources by storing property visibility permissions in an object-specific visibility policy. An object-specific visibility policy contrasts with a visibility policy governing multiple objects, such as the centralized security records that may be used when governing access to the objects themselves. The object-specific visibility policy may be stored in the storage layer of the knowledge-graph object with the object properties and content. Storing the visibility information and the actual properties nearby within a storage system may reduce computer usage required when the visibility policy is evaluated.

The object-specific visibility policy is also in contrast to a property specific policy. The object-specific policy collects permissions for all object properties in one record. While the property-specific policy might include an access permission field with each property. Creating a new field for each property could double, or otherwise significantly increase, the memory usage required to store the properties. In contrast, a single record of visibilities for an object uses much less memory.

Some implementations may include multiple visibility records for a single object. Together the visibility records form the object visibility policy. An object visibility policy may have a single visibility record or multiple visibility records. It may be desirable to interrogate these policies only a single time for each object property requested. This may be achieved by forming a property requested record and a property granted record. All the requested properties (or offsets to the properties) are initially entered into the properties requested record. The first property may be compared to access granted in a first visibility record. If access is granted, then the property is removed from the requested record and added to the granted record.

BRIEF DESCRIPTION OF THE DRAWINGS

The technology described herein is illustrated by way of example and not limitation in the accompanying figures in which like reference numerals indicate similar elements and in which:

FIGS. 5A-D illustrate a process used to retrieve visible properties while interrogating each property a single time, in accordance with an aspect of the technology described herein;

DETAILED DESCRIPTION

Figure 1:
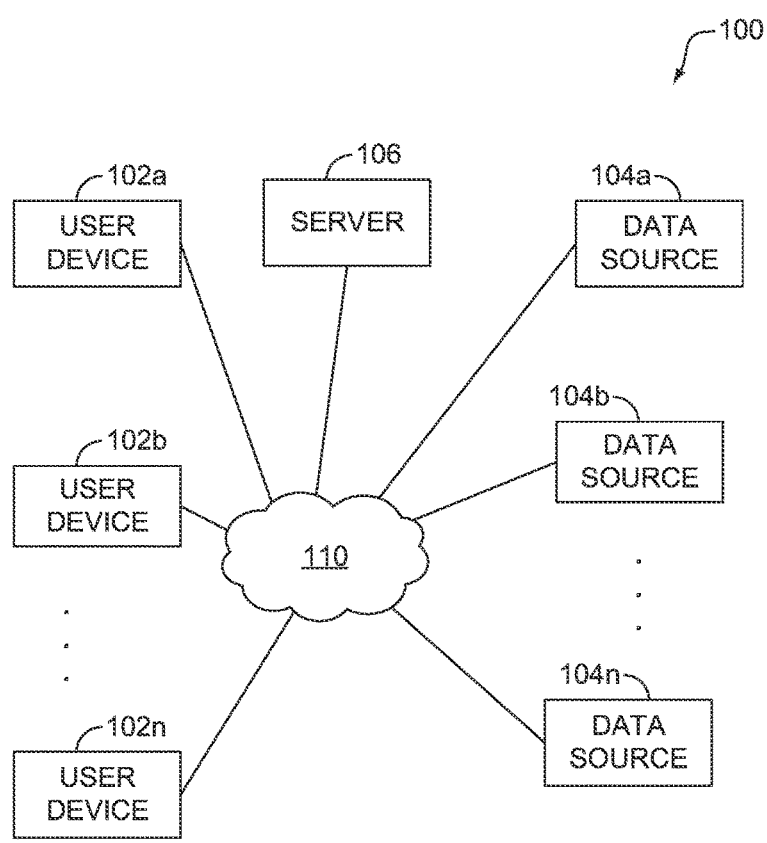
FIG. 1 is a block diagram of an example operating environment suitable for implementations of the present disclosure.

The various technology described herein are set forth with sufficient specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The technology described herein protects the privacy and security of data stored in a knowledge graph ("graph") by enforcing visibility policies when returning property information in response to a query or other attempt to extract property information from the graph and/or about the graph. The visibility policy may be enforced against properties of knowledge-graph objects, which include nodes and edges. As used herein, a property is a portion of content associated with a node or edge, but not the entire content associated with the object. In aspects, a property may be described as metadata associated with the primary content of the node or edge. Thus, author, edit date, and created date, may be properties of a node associated with a document. The document content may not be a property. Other nodes may be an aggregation of information about an entity. For example, a user profile node includes facts (e.g., name, address, email, phone number, job title) describing the user. These facts may be described as properties of the user node and managed individually through the technology described herein.

A visibility policy may govern read-access to a property of a knowledge-graph object. A visibility policy with a default-restricted visibility may restrict access to all users, except those designated in the policy as having access. Alternatively, a visibility policy with a default-unrestricted visibility may grant access to all users, except those designated as not having access. The technology described herein may work with both default statuses.

In one aspect, property visibilities are managed at the object level. In other words, the visibility policy for an object property may be enforced during the process of extracting information from the object. The visibility policies may be stored with the object and used to prevent restricted properties from being extracted from the object, let alone the graph. This is in contrast to conventional methods that may attempt to enforce visibility policies at the information ingestion process or through another service-level process after information is output from the graph.

The technology described herein minimizes usage of computer resources by storing property visibility permissions in an object-specific visibility policy. An object-specific visibility policy contrasts with a visibility policy governing multiple objects, such as the centralized security records that may be used when governing access to the objects themselves. The object-specific visibility policy may be stored in the storage layer of the knowledge-graph object with the object properties and content. Storing the visibility information and the actual properties nearby within a storage system may reduce computer usage required when the visibility policy is evaluated.

The object-specific visibility policy is also in contrast to a property specific policy. The object-specific policy collects permissions for all object properties in one record. While the property-specific policy might include an access permission field with each property. Creating a new field for each property could double, or otherwise significantly increase, the memory usage required to store the properties. In contrast, a single record of visibilities for an object uses much less memory.

A further optimization may be achieved by storing visibility restricted and unrestricted properties in separate records. This arrangement avoids the need to perform visibility validation operations to access properties without restrictions. The result would be the same (e.g., access is granted), but the validation operation is completely avoided or simplified, depending on the implementation.

Some implementations may include multiple visibility records for a single object. Together the visibility records form the object visibility policy. An object visibility policy may have a single visibility record or multiple visibility records. It may be desirable to interrogate these policies only a single time for each object property requested. This may be achieved by forming a property requested record and a property granted record. All the requested properties (or offsets to the properties) are initially entered into the properties requested record. The first property may be compared to access granted in a first visibility record. If access is granted, then the property is removed from the requested record and added to the granted record. No further validations are required for the first property. The process may repeat until each property is evaluated against the first visibility record. The properties left in the requested record may then be evaluated against the next visibility record. When all visibility records are evaluated, then properties left in the requested record are not deemed restricted and not communicated to the requestor. Properties in the granted record are communicated to the requestor.

In some embodiments, the technology described herein comprises three components. First, the knowledge graph, which may be represented in any suitable architecture. Second, the visibility-policy collection system. Third, the visibility-policy enforcement system.

The visibility-policy collection system provides an interface through which users may specify their visibility preferences for the properties of an object. The preferences may be used to form a visibility policy for the object. The ability to create or edit a visibility policy may be governed at different levels in the system. For example, a user with full access to a node (e.g., document, file) may be able to edit the property visibility profile. A visibility record may comprise properties governed and a user or group of users with visibility to the property.

The visibility-policy enforcement system compares an information request to applicable visibility policies. In an aspect, a query may be submitted with a security token that may identify a requestor of the query. Depending on the result of the comparison, all property information responsive the query or a portion thereof may be provided. If a portion of the responsive property information is protected by a visibility policy, then that portion may be omitted from the response, and the portion of information that is not protected by the visibility policy may be output to the requesting entity.

Having briefly described an overview of aspects of the technology described herein, an exemplary operating environment in which aspects of the technology described herein may be implemented is described below in order to provide a general context for various aspects.

Turning now to FIG. 1, a block diagram is provided showing an example operating environment 100 in which some aspects of the present disclosure may be employed. It should be understood that this and other arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; and network 110. Each of the components shown in FIG. 1 may be implemented via any type of computing device, such as computing device 900 described in connection to FIG. 9, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

User devices 102a and 102b through 102n may be client devices on the client-side of operating environment 100, while server 106 may be on the server-side of operating environment 100. The user devices may facilitate generation of objects that are stored in a knowledge graph. For examples, the user devices may create and edit documents that are stored in the knowledge graph as a node. The record of interactions, such as views, edits, may also be saved in the knowledge graph as edges. The devices may belong to many different users and a single user may use multiple devices.

Server 106 may comprise server-side software designed to work in conjunction with client-side software on user devices 102a and 102b through 102n to implement any combination of the features and functionalities discussed in the present disclosure. For example, the server 106 may run the information management system 201, which manage access to and use of information in a knowledge graph. The server 106 may receive digital assets, such as files of documents, spreadsheets, emails, social media posts, user profiles, and the like for storage, from a large number of user devices belonging to many users. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one aspect, user devices 102a through 102n may be the type of computing device described in relation to FIG. 9 herein. By way of example and not limitation, a user device may be embodied as a personal computer (PC), a laptop computer, a mobile device, a smartphone, a tablet computer, a smart watch, a wearable computer, a fitness tracker, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

Data sources 104a and 104b through 104n may comprise data sources and/or data systems, which are configured to make data available to any of the various constituents of operating environment 100, or system 200 described in connection to FIG. 2. For example, the data sources may comprise email servers, social media servers, or other sources of objects that may be stored in a knowledge graph managed by the technology described herein. Data sources 104a and 104b through 104n may be discrete from user devices 102a and 102b through 102n and server 106 or may be incorporated and/or integrated into at least one of those components.

Figure 2:
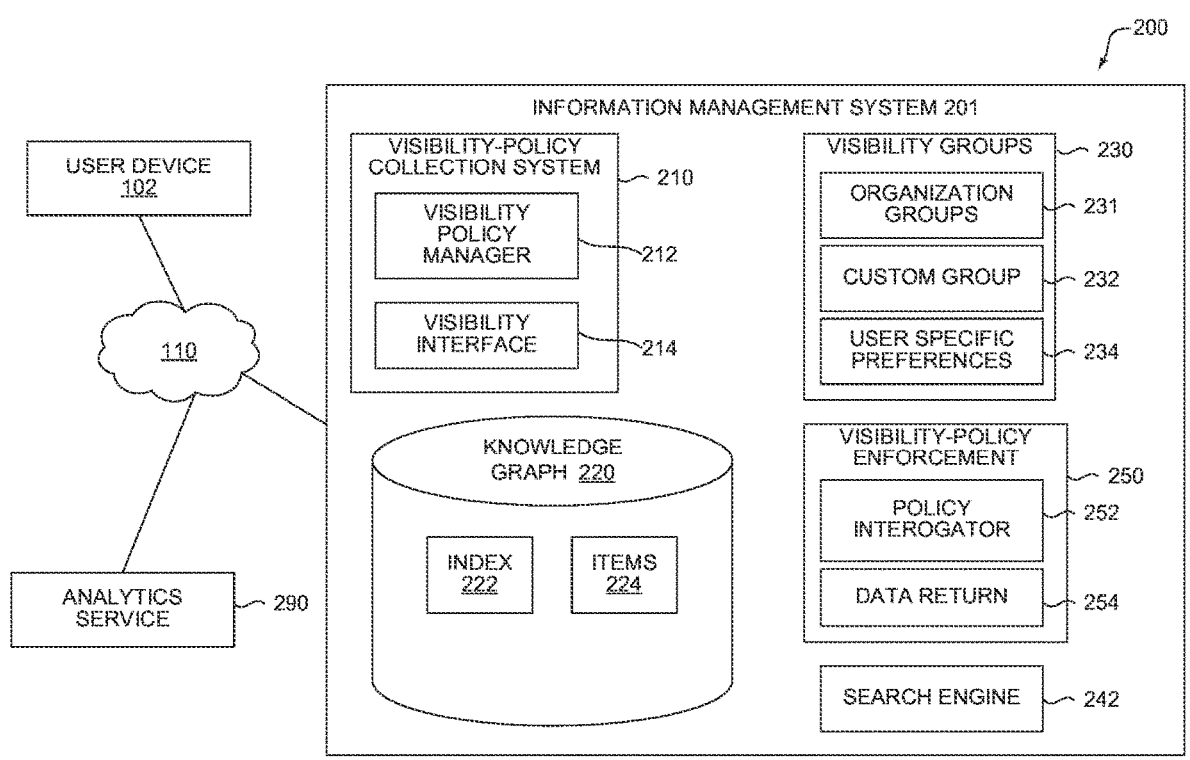
FIG. 2 is a diagram depicting an example computing architecture suitable for implementing aspects of the present disclosure.

Operating environment 100 may be utilized to implement one or more of the components of system 200, described in FIG. 2, including components for collecting user data, defining visibility policies, receiving user queries related to an object property, responding to the query.

Referring now to FIG. 2, with FIG. 1, a block diagram is provided showing aspects of an example computing system architecture suitable for implementing some aspects of the present disclosure and designated generally as system 200. System 200 represents only one example of a suitable computing system architecture. Other arrangements and elements may be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively connects components of system 200 including user device 102, analytics service 290, and information management system 201. The information management system 201 includes a visibility-policy collection system 210 (and its components 212 and 214), knowledge graph 220 (and its components 222, 224), visibility groups 230 (and organizational groups 231, custom groups 232, user visibility preferences 234), search engine 242, and visibility-policy enforcement component (and its components 252 and 254). These components may be embodied as a set of compiled computer instructions or functions, program modules, computer software services, or an arrangement of processes carried out on one or more computer systems, such as computing device 900 described in connection to FIG. 9, for example.

In one aspect, the functions performed by components of system 200 are associated with one or more applications, services, or routines. In particular, such applications, services, or routines may operate on one or more user devices (such as user device 102a), servers (such as server 106), may be distributed across one or more user devices and servers, or be implemented in the cloud. Moreover, in some aspects, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s), such as the operating system layer, application layer, hardware layer, etc., of the computing system(s). Alternatively, or in addition, the functionality of these components and/or the aspects described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with reference to specific components shown in example system 200, it is contemplated that in some aspects functionality of these components may be shared or distributed across other components.

Continuing with FIG. 2, the information management system 201 is used to receive, track, manage and store digital assets, such as document files, spreadsheet files, presentation files, email files, group chats, user profiles, and the like. These digital assets may be entities represented by nodes in a knowledge graph. The information management system 201 may be provided for one or more organizations, such as a corporation or partnership. In a federated arrangement, some or all of the information in a knowledge graph may be shared between two or more organizations. The information management system 201 may be capable of keeping a record of various versions of digital assets created and modified by different users (e.g., history tracking). An information management system may have some overlap with or alternatively be described as a content management system, enterprise content management (ECM) system, digital asset management, document imaging, workflow system, and records management system.

The information management system 201 may store information in one or more servers. The servers may be private servers. The servers could be provided by a service provider, in which case the organization and/or devices may be described as a tenant. Communications between components of the system may be through various appropriate application program interfaces (APIs) including a tenant API (TAPI) or personal API (PAPI). Aspects of the technology described herein are not limited to the information management system 201 described herein.

The visibility-policy collection system 210 is responsible for collecting visibility policy information from users, groups, and organizations. The collected information is processed and stored within the knowledge graph 220 as an object visibility policy.

The visibility policy manager 212 receives information from the visibility interface 214 and updates the visibility policy for an object. The updating may include adding information to or subtracting information from the visibility permissions in the policy. In one aspect, the visibility policy manager 212 is responsible for synchronization of new instructions with organizational, group, or existing user guidance. The synchronization may follow a preference system to manage conflicts between inconsistent visibility instructions. In this sense, the synchronization process may reconcile inconsistent instructions between organizations, groups, and users. In an aspect, only the resulting status is stored within the object visibility policy, while inputs to determining the result are stored elsewhere, such as in the relevant profiles. For example, if a group visibility requires that all members of the group are able to access properties of group objects (i.e., objects associated with a group), then a user's specific instructions to restrict access to certain group members may not be followed. Organizations may be able to establish preferences to determine whether organization, group, or user instructions govern, when in conflict.

In some instances, the group or organizational policies establish default visibility policies that may be changed by a user with appropriate permissions to change visibility settings for object properties. The visibility policy manager 212 may consult these preferences before implementing a requested change to a visibility policy.

The visibility interface 214 may present a list of groups for a user or organization to select as allowed or restricted. The visibility interface 214 may be output for display via a user device 102. The visibility interface 214 may enable individual users to be looked up and selected. These users may be designated as allowed or restricted in various aspects. In other words, the visibility interface 214 may provide an opportunity for a user to block access to designated groups or individuals or to allow access to individuals and groups. Preformed groups may include ad hoc groups, such as project teams, or more permanent groups based on organizational structure (e.g., human resources, sales, legal, manufacturing, travel). Examples of other preformed groups could include a manager and all direct reports to the manager. Groups may also be formed through a nearest neighbor analysis of the knowledge graph 220. Essentially, the nearest neighbor analysis may look for groups of people interacting with the same objects (e.g., documents).

The visibility interface 214 may present a list of services for a user or organization to select as allowed or restricted. For example, the analytics service 290 may be granted limited access to property information, while the search engine 242 is granted full access. Both the analytics service 290 and the search engine 242 may submit an audience viewing a requested output with the request for property information. The audience may define the property requestor for determining visibility authorization. In an aspect, a user may grant a requestor access to a property when requested through the search engine 242, but deny access when requested through the analytics service 290.

The visibility interface 214 may allow a user or organization to specify in a visibility policy that one or more properties of an object be restricted. A group of properties may be selected and then the same access granted for all of the selected properties.

The visibility interface 214 may allow users or organizations to specify a property type that is restricted in general, or do so on a node-by-node basis. For example, an organization may restrict access to the "home address" property in all employee user profiles. In contrast, employees may access the "work email" property. A group or organization may establish a global default visibility policy for all objects of a certain type (e.g., document, user profile, spreadsheet). The default policy is initially applied, but may be modified on an object-by-object basis.

Blocking access to a property is different from blocking access to the user profile itself, which may be a node in the knowledge graph. Blocking access to the user profile itself may prevent a user or program from accessing (e.g., opening, viewing, copying) all of the content in the user profile. Blocking access to a property allows the other properties (and non-property content, if applicable) to be viewed.

The knowledge graph 220 is a repository for information that may be organized as a semantic graph. The technology described herein may work with various knowledge graph architectures including Labelled-Property Graphs (LPGs), and Resource Description Framework (RDF) based graphs. With a labelled-property graph, nodes and edges both may have metadata (properties) assigned to them in the form of key-value pairs. They may be used for querying and analyzing paths through the graph. RDF based graph databases store data in the form of triple-statements (subject-predicate-object). The predicates (relationships) that join nodes together confer semantic meaning upon the data.

Knowledge graphs are defined by a schema and composed of nodes and edges connecting the nodes. The nodes may represent entities, which may be of different types. The edges that connect the nodes represent relationships between the entities. Nodes may have properties. For example, in the document domain, properties may include a date created, author, document types, document name, document version, document ID, and the like.

The index 222 stores information that may be used to find or retrieve objects (e.g., nodes, edges) represented within the knowledge graph 220. For example, the index 222 may store a location where a file may be retrieved. The index 222 may store relationship information, such as views, that form edges within the knowledge graph. In an aspect, the index 222 may be used to find objects in the knowledge graph 220.

The digital assets 224 include the files or other information that are represented in the knowledge graph 220. The digital assets 224 may be represented as nodes in the knowledge graph 220. The graph 220 itself may store information about the digital asset 224 as a record, but the digital asset may be stored in and retrieved from a separate computer storage that may be described herein as the storage layer of the node or edge. The storage layer may follow a different organization than the logical organization used to relate graph objects.

The organizational groups 231 store information about the organization including information about the organization's default visibility policy for one or more groups. The organizational groups 231 also include definitions for one or more organizational groups, such as the travel or accounting department. Each group may include members based on an individual attribute, such as user name, or possibly a different attribute in common between members, such as organizational membership. The organizational groups 231 may be stored apart from the knowledge graph 220. In addition to visibility policy information, the organizational groups 231 may include an organizational hierarchy. In some aspects, the organizational hierarchy may be used to form groups. The organizational groups 231 may include rules governing changes to default visibility policies, such as a record of users authorized to change visibility polices and which policies they are authorized to change. The organizational groups 231 may also store information unrelated to visibility information, such as policies for adding and removing information from the knowledge graph or otherwise governing knowledge graph 220 operations.

The custom groups 232 define a group of individual users and may define a default visibility policy that applies to these individuals. In contrast, to the organizational groups, the group may be set up by a single user or group of users. A custom group's record may be stored for reuse when assigning visibilities. In one aspect, a group visibility policy allows access to information when the audience is the group as a whole, an individual in the group, or a subset of individuals in the group. A group visibility policy may deny access when its intended audience includes one or more users outside of a group.

The user preferences 234 store visibility information for individual users. The user preferences 234 may also store information unrelated to visibility information. Information from the user preferences 234 may be used to populate visibility policy information when the user creates a new object in the knowledge graph.

The search engine 242 is enabled to find information in the knowledge graph and is an example of a consumer of graph information. The search engine 242 may consume both the information stored in the graph and analytical information about the stored information. For example, the search engine may rank documents stored in the graph according to views, edit date, author influence, and the like.

The visibility-policy enforcement component 250 enforces the various visibility policies to make sure the information communicated from objects in the knowledge graph complies with these policies. In one aspect, the visibility policies may be inspected in sequential order to make a decision about whether information is restricted or allowed. In one aspect, the organizational visibility policies are inspected first. A request for information may be received from a requestor and validated by the visibility-policy enforcement component 250. In one aspect, the request takes the form of a query. The request may include specific information, such as a definition of the requested information. The request may also specify a requestor and a requesting service. In one aspect, the request is submitted with a token that includes information, such as the requesting service, search parameters, and requestor.

In response to receiving the request, the organizational visibility policies may be inspected by the visibility-policy enforcement component 250 to determine if the requested property is governed by a visibility policy. For example, the visibility policies may be inspected to determine if a visibility policy is applicable to a requestor. The requested properties that the requestor has visibility to are returned by the data return component 254, while the other properties are not returned.

The analytics service 290 is just one example of a service that may submit queries to the knowledge graph. The analytics service may provide a number of services to users. The services may be specific to a single user or a group. The single user or group may be indicated as the requestor of a query submitted by the analytics service 290. Different services may be provided from different information from the graph. Visibility policies may apply to specified services offered by the analytics service in some cases, or to the underlying requested data.

Figure 3:
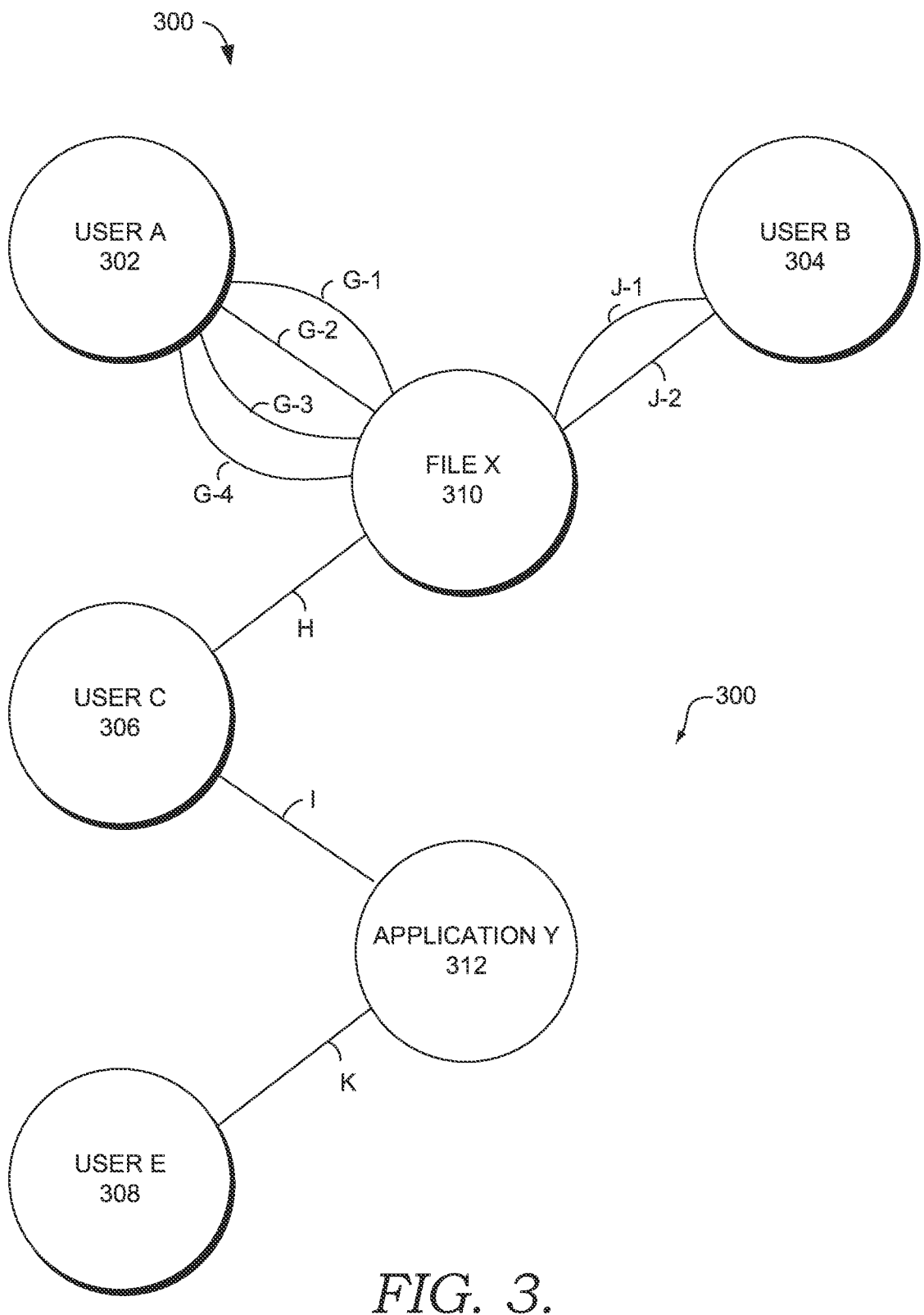
FIG. 3 shows a knowledge graph, in accordance with an aspect of the technology described herein.

FIG. 3 is a schematic diagram of an example knowledge graph 300, according to some embodiments. A knowledge graph is a pictorial representation or visualization for a set of objects where pairs of nodes or "vertices" are connected by edges or "links." Each node represents a particular position in a one-dimensional, two-dimensional, or three-dimensional (or any other dimensions) space. A node is a point where one or more edges meet. An edge connects two nodes. Specifically, the knowledge graph 300 includes the nodes of: "user a 302," "user b 304," "file x 310," "user c 306," "application y 312," and "user e 308." The knowledge graph further includes the edges K, I, H, J-1, J-2, and G-1, G-2, G-3, G-4. The user nodes may include user profile information that may be described as properties of the node. For example, a user first name, user last name, home address, work address, email, phone number, office location, job title, and the like are possible properties of the user node.

The knowledge graph 300 shows the relationships between various users and digital assets, such as file x 310 and application y 312. It is understood that these digital assets are representative only. As such, the digital assets may alternatively or additionally include calendars that users have populated, groups that users belong to, chat sessions that users have engaged in, text messages that users have sent or received, and the like. In some embodiments, the edges represent or illustrate a specific user interaction (e.g., a download, sharing, saving, modifying or any other read/write operation) with specific digital assets.

Representing digital assets as nodes allow users to be linked in a more comprehensive manner than has been available with conventional techniques. For example, application y 312 may represent a group container (e.g., MICROSOFT TEAMS) where electronic messages are exchanged between group members. Accordingly, the knowledge graph 300 may illustrate which users are members of the same group. In another illustrative example, the knowledge graph 300 may indicate that user a 302 downloaded or otherwise accessed file x 310 at a first time (represented by edge G-1), a second time (represented by edge G-2), a third time (represented by edge G-3), and a fourth time (represented by edge G-4). The graph 300 may also illustrate that user b 304 also downloaded the file x 310, as represented by the edge J-1 and wrote to the file x 310 at another time, as represented by the edge J-2. Accordingly, the knowledge graph 300 may illustrate a much stronger relationship between the user a 302 and file x 310 relative to user b 304, based on the edge instances illustrated between the respective nodes (e.g., user a 302 downloaded file x 310 more times relative to user b 304). Other factors associated with an edge may be considered when determining an analytic result (e.g., strength of relationship). For example, the duration of a viewing instance that is represented by edge G-1 may be stored as a property of the edge G-1. Visibility to this property and other edge properties may be managed the technology described herein. Edges between a file and a user may represent any of a large number of actions that may be taken with reference to the file. A non-exclusive list of user actions that may create edges in the knowledge graph 300 include, access modification, approve, check in, copy, delete, delete a version, deliver a secure link, designating an official version, download, edit (content), edit profile, email link, email copy, new version, open, move, print, rename, sign, and view. Each of these actions may be associated with properties describing the action. For example, the date of the action and/or the duration of the action, if applicable, may be stored as a property that is associated with the edge.

In aggregate, the knowledge graph 300 indicates user a 302 interacted with file x 310 four times (edges G-1 through G-4), user b 304 interacted with file x 310 twice (J-1 and J-2), and user c 306 interacted with file x 310 once (H). The knowledge graph 300 further indicates that user c 306 interacted with application y 312. The knowledge graph 300 further indicates that user e 308 also interacted with application y 312.

In some embodiments, a "distance" corresponds to a number of edges in a shortest path between node U and node V. In some embodiments, if there are multipole paths connecting two nodes, then the shortest path is considered as the distance between two nodes. Accordingly, distance may be defined as d(U,V). For instance, the distance between user a 302 and file x 310 is 1 (e.g., because there is only 1 edge (any of G-1 through G-4)), the distance between user a 302 and user b 304 (and user c 306) is 2, whereas the distance between user a 302 and user e 308 is 4 between user a 302 and user e 308). Accordingly, user a's 302 two closest connections are user c 306 and user b 304. This distance may be used to define groups within the custom groups 232.

Figure 4:
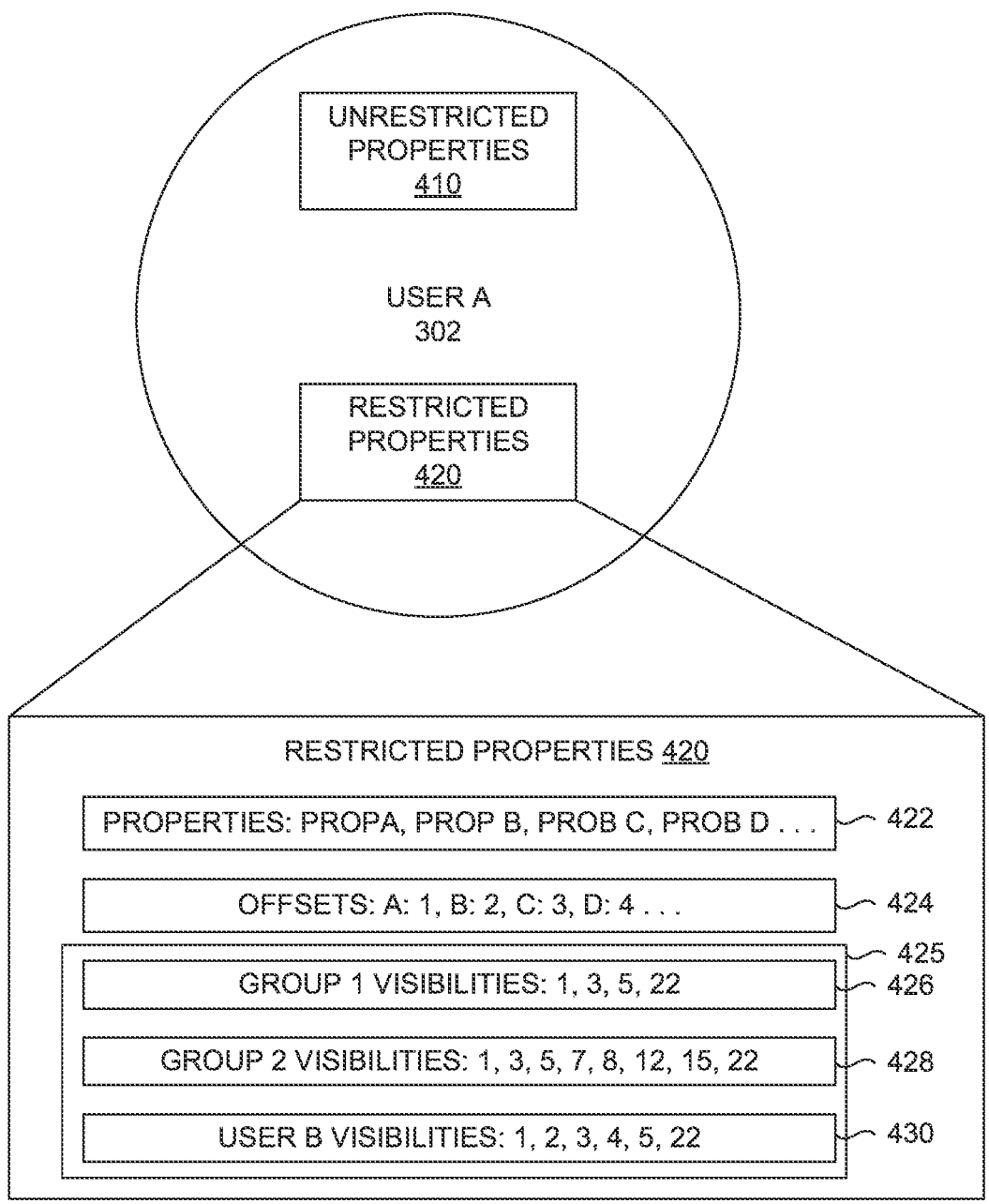
FIG. 4 shows a detailed view of a user profile node with embedded visibility policies, in accordance with an aspect of the technology described herein.

FIG. 4 shows a detailed view of user a node 302. As shown, the user a node 302 includes unrestricted properties 410 and restricted properties 420. The user node also includes a visibility policy (e.g., visibility records 426, 428, and 430) that governs access to properties in the restricted properties 420. The unrestricted properties 410 and the restricted properties 420 may be locations on the storage layer associated with the user a node 302. The unrestricted properties 410 comprises properties that are not associated with a visibility policy and/or not associated with a visibility policy that imposes access restrictions beyond those imposed on information within the knowledge graph 300. In contrast, the restricted properties 420 comprises properties that are associated with a visibility policy and/or associated with a visibility policy that imposes access restrictions beyond those imposed on information within the knowledge graph 300. The restricted properties 420 may be accessed after comparing requestor credentials to the visibility policy governing properties in the restricted properties 420. Each property in the restricted properties 420 may have a separate visibility criteria. The properties in the unrestricted properties 410 may be freely accessed by users and applications that have access to the knowledge graph 300. In other words, properties in the unrestricted properties 410 may be accessed without an additional property-based visibility analysis.

Storing the restricted properties and unrestricted properties in separate storage locations may reduce CPU usage by avoiding a need to run access confirmation operations for the unrestricted properties. In contrast, access confirmation operations may be run for each requested property in the restricted properties 420. The unrestricted properties may also be stored in a comparatively condensed format because a field specifying visibility restrictions or visibility grants need not be included with the unrestricted properties.

Initially an object's properties may be distributed between the unrestricted properties 410 and restricted properties 420 according to a default visibility policy, such as the visibility policies described previously with reference to FIG. 2.

The detailed view of the restricted properties 420 includes the restricted properties 422, an offset key 424, group-one visibility record 426, group-two visibility record 428, and user B visibility record 430. The restricted properties 422 include property A, property B, property C, and property D. Only four properties are shown for the sake of simplicity. The restricted properties may be stored in an array. The offsets in the offset key 424 are integers indicating the distance (displacement) between the beginning of the property array and a given property in the array. Using offsets conserve memory by allowing the various visibility policies to be defined by the offset to the property rather than the lengthier property name or other identification. The offset key 424 may take the form of a dictionary that maps the offset to the property. Thus, property C is mapped to offset three in offset key 424.

The visibility policy 425 for restricted properties 420 comprises three different visibility records. Implementations may include any number of visibility records. As used herein, a visibility record maps a membership definition to corresponding properties the membership has visibility to (e.g., is able to view). The membership definition may be a single user, as with user B visibility record 430, or a group of users, as with group-one visibility record 426 and group-two visibility record 428. The group-one visibility record 426 includes a group one definition and offsets to the properties the members of group one are authorized to view. The group one definition may be a reference to a group definition outside of the restricted properties 420. For example, an organizational profile may include group definitions for the organization. Some groups may correspond to organizational groups, such as R&D, HR, accounting, sales, and the like. In other words, the group may be formed based on a user's position in an organization. In this example, the group definition could be a reference to the organizational HR group. All members of the HR group may then have access to properties defined within the group-one visibility record 426. In another example that may be of particular relevance in a federated environment that allows multiple organizations to share access to data in the knowledge graph 300, the visibility record may grant access to all members of one organization while denying access to all members of a second organization within the federation. Thus, determining whether a requestor has access to a property may entail checking a requestor's credentials to determine whether the requestor is a member of group one, group two, or is user B. Other groups may be put together for other reasons, such as membership on a project team, technological expertise, and the like. Membership in a group may be ascertained by looking up an identification, such as a username, for the requestor and comparing the identification to members included in the group definition. The group-two visibility record 428 has a separate group-two definition. The user B visibility record 430 grants visibility to the single user, "user B."

The group-one visibility record 426 includes offsets 1, 3, 5, and 22. The inclusion of these offsets means that the users included within the group one definition would have visibility to the properties corresponding with these offsets. The group-two visibility record 428 includes offsets 1, 3, 5, 7, 8, 12, 15, and 22. The inclusion of these offsets means that the users included within the group two definition would have visibility to the properties corresponding with these offsets. The user B visibility record 430 includes offsets 1, 2, 3, 4, 5, and 22. The inclusion of these offsets means that user B would have visibility to the properties corresponding with these offsets.

The visibilities shown in FIG. 4 positively grant access to properties corresponding to the offsets. In other aspects, a visibility record could deny access to properties, instead of granting access. For example, the group could have access to all properties in the restricted properties 420, except for those properties listed in the group visibility. In one aspect, the denial of access could be used in combination with other group visibilities to limit access to a subgroup of a first group. For example, a first group definition could grant property access to all group members, except group members denied access in a second group visibility record. Other combinations of positively granting access and denying access to different groups are possible.

FIGS. 5A, 5B, 5C, and 5D illustrate the use of a requested record 512 and a granted record 514 in order to limit validation operations to a single visibility confirmation per requested property. In particular, FIGS. 5A, 5B, 5C, and 5D show the movement of properties from a requested group to a granted group as validation operations progress. The query 510 requests property A, property C, and property M. The requestor listed is user B. The visibility policy interrogator 252 examines various membership definitions to determine which visibility records should be evaluated. In this example, user B, is a member of the user B visibility record 430. The visibility policy interrogator 252 then proceeds to compare the requested properties with the properties user B is granted access to within the user B visibility record 430.

Initially, all of the requested properties are added to the requested record 512A. In this example, the offsets for the requested properties are shown as offsets 1, 3, and 13. In an aspect, an interrogation operation is performed on each offset until access is granted or all relevant visibility policies have been evaluated. If a property remains in the requested record 512A after all visibility policies of been evaluated then access to that property is denied. When the validation process starts, the granted records 514A is empty. A first validation operation is performed for property A using offset one. The validation operation looks for a granted visibility in a visibility policy that user B is a member of. As may be seen in FIG. 4, the user B visibility record 430 include offset one. Accordingly, offset one is removed from the requested record 512B and added to the granted record 514B. This concludes the validation operation for property A. Removal of property A from the requested group 512B prevents property A from being interrogated a second time.

Next, offset three is evaluated against the user B visibility record 430. Since offset three is in the user B visibility record 430, offset three is removed from the requested record 512C and added to the granted record 514C. Finally, offset 13 is evaluated against the user B visibility record 430, which does not grant visibility to offset 13. Accordingly, offset 13 remains in the requested record 512D and is not added to the granted record 514D. Having evaluated the request against the user B visibility record 430, visibility policy interrogator 252 may evaluate just offset 13 against any other visibility record that user B may be a member of. If user B is not granted access to the property associated with offset 13 in any other visibility record, then access to the property M is denied and the properties associated with offset one and three are communicated to the user B. Optionally, a message communicating that access to property M is denied may be communicated to user B.

Exemplary Methods

Figure 6:
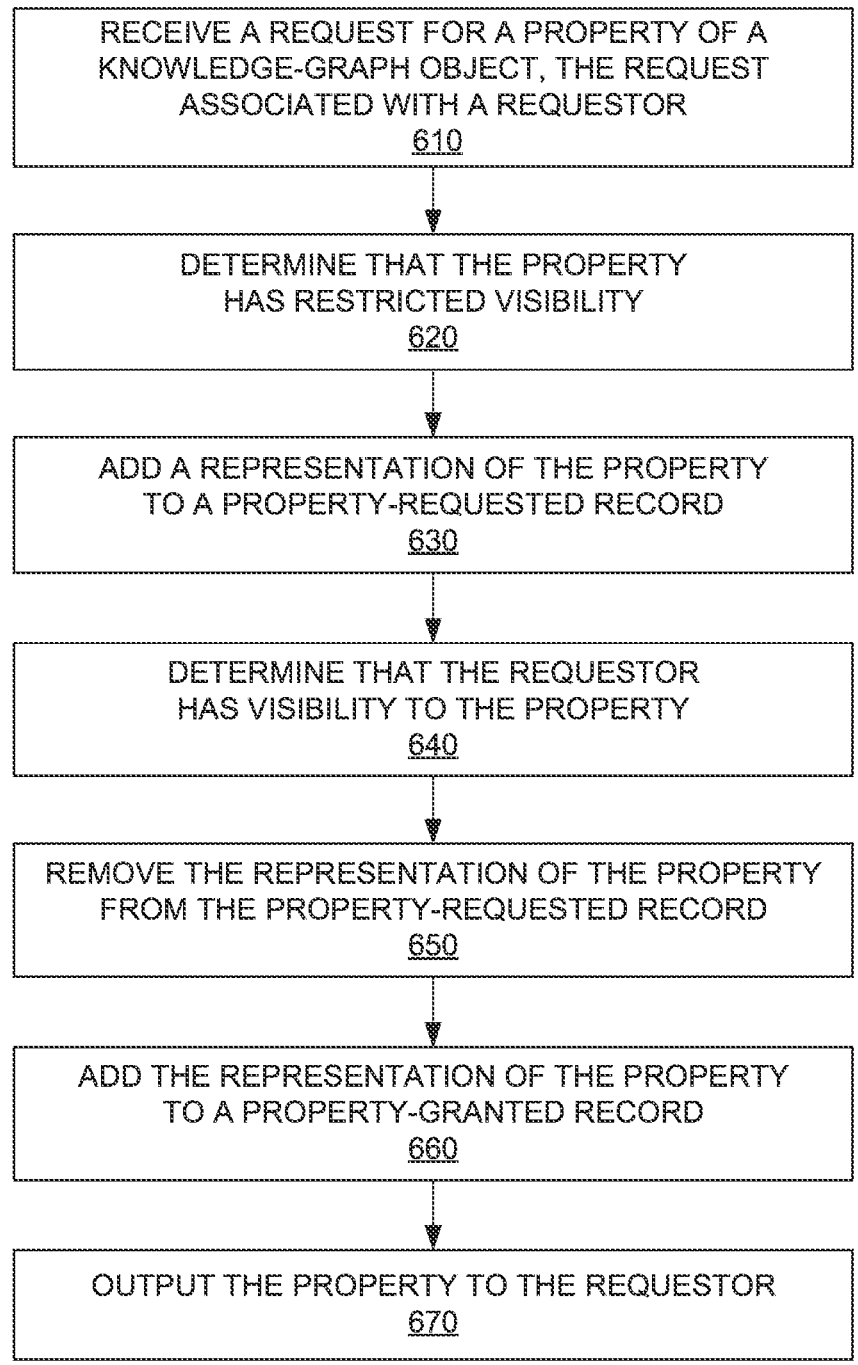
FIGS. 6-8 are flow diagrams showing additional exemplary methods of managing visibility settings, in accordance with an aspect of the technology described herein.
Figure 7:
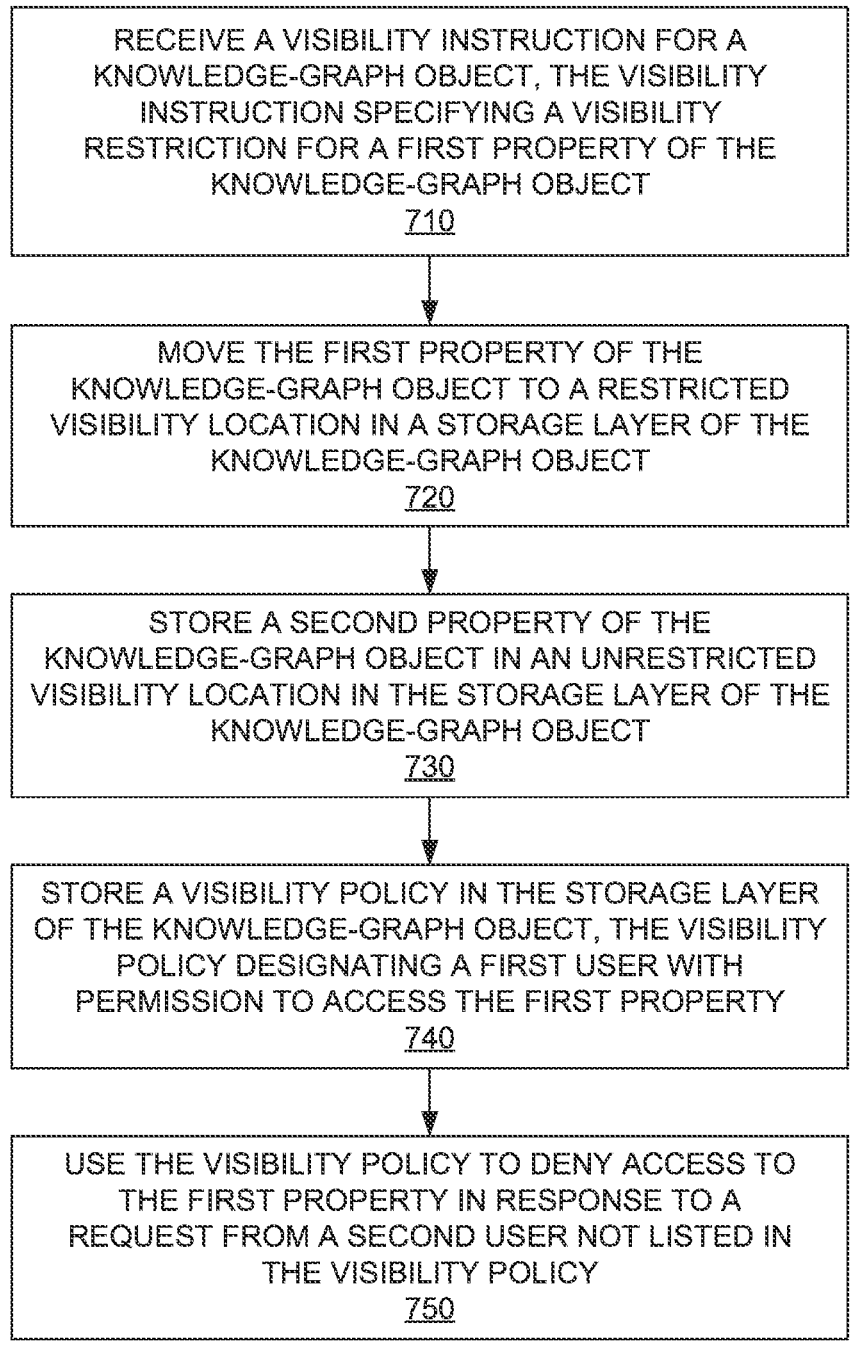
Figure 8:
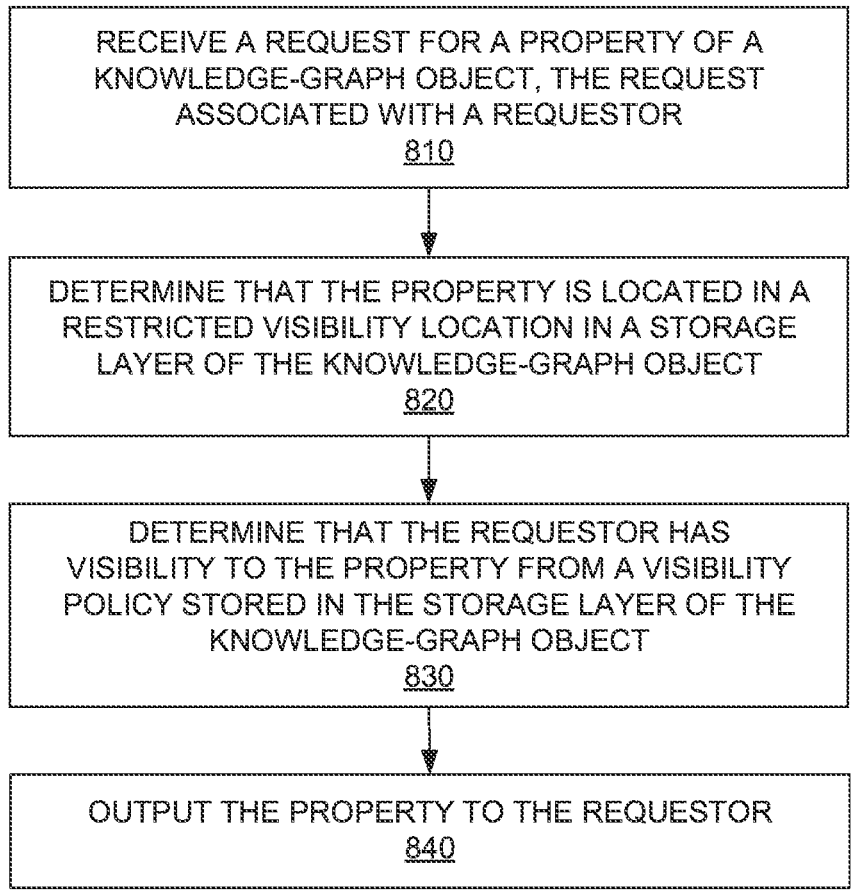

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), or a plug-in to another product, to name a few. In addition, methods 600, 700, and 800 are described, by way of example, with respect to the information management system 200 of FIG. 2 and additional features of FIGS. 3, 4 and 5. However, these methods may additionally or alternatively be executed by any one system, or any combination of systems, including, but not limited to, those described herein.

FIG. 6 is a flow diagram showing a method 600 for enforcing a visibility policy on data output from a knowledge graph, in accordance with some embodiments of the present disclosure. The method 600, at block 610 includes receiving a request for a property of a knowledge-graph object, the request associated with a requestor. The request may be received from a service. The service may be an application and/or a function performed by one or more applications. For example, the service may be an analytics program, document management program, file-editing application (e.g., word processing application, spreadsheet application). The request may also specify a requestor, which may be an intended audience that will see a result of the request. The requestor could be a single user or a group. The audience does not need to actively request the information to be a requestor. A service may automatically request the information for any number of reasons, for example, to create a user experience. In one aspect, the query is submitted with a token that identifies the requestor. The information specified in the token may correspond to information in a visibility policy, such as a property name and object name and/or location. The information specified in the token may be used to determine what information is responsive to the query and whether the requestor (e.g., user, audience or service) may access the requested information.

The method 600, at block 620 includes determining that the property has restricted visibility. Determining that the property has restricted visibility may comprises determining the property is stored in a portion of the object storage layer designated for restricted properties. In an aspect, properties not associated with the restricted properties are not restricted and are stored separately. In another aspect, the object visibility policy is evaluated to determine whether one or more records restrict access to the property.

The method 600, at block 630 includes adding a representation of the property to a property-requested record. The property request record and its use have been described previously with reference to FIG. 5. In one aspect, the representation is an offset to the property in an array.

The method 600, at block 640 includes determining that the requestor has visibility to the property. In one aspect, the requestor is determined to have visibility because the visibility policy assigns the requestor visibility to the property. The requestor may have visibility through an individual assignment or a group membership.

The method 600, at block 650 includes removing the representation of the property from the property-requested record. The property request record and its use have been described previously with reference to FIG. 5. In one aspect, the representation is an offset to the property in an array.

The method 600, at block 660 includes adding the representation of the property to a property-granted record. The property-granted record and its use have been described previously with reference to FIG. 5. In one aspect, the representation is an offset to the property in an array.

The method 600, at block 670 includes outputting the property to the requestor. Outputting the property can be performed in a variety of manners that are adapted to the application that requested the property. In one aspect, the property is provided through an application program interface to the knowledge graph.

FIG. 7 is a flow diagram showing a method 700 for enforcing a visibility policy on data output from a knowledge graph, in accordance with some embodiments of the present disclosure. The method 700, at block 710 includes receiving a visibility instruction for a knowledge-graph object, the visibility instruction specifying a visibility restriction for a first property of the knowledge-graph object.

The method 700, at block 720 includes moving the first property of the knowledge-graph object to a restricted visibility location in a storage layer of the knowledge-graph object.

The method 700, at block 730 includes storing a second property of the knowledge-graph object in an unrestricted visibility location in the storage layer of the knowledge-graph object.

The method 700, at block 740 includes storing a visibility policy in the storage layer of the knowledge-graph object, the visibility policy designating a first user with permission to access the first property.

The method 700, at block 750 includes using the visibility policy to deny access to the first property in response to a request from a second user not listed in the visibility policy. Access can be denied when the visibility policy does not grant the requestor visibility to the property.

FIG. 8 is a flow diagram showing a method 800 for enforcing a visibility policy on data output from a knowledge graph, in accordance with some embodiments of the present disclosure. The method 800, at block 810 includes receiving a request for a property of a knowledge-graph object, the request associated with a requestor. The request may be received from a service. The service may be an application and/or a function performed by one or more applications. For example, the service may be an analytics program, document management program, file-editing application (e.g., word processing application, spreadsheet application). The request may also specify a requestor, which may be an intended audience that will see a result of the request. The requestor could be a single user or a group. The audience does not need to actively request the information to be a requestor. A service may automatically request the information for any number of reasons, for example, to create a user experience. In one aspect, the query is submitted with a token that identifies the requestor. The information specified in the token may correspond to information in a visibility policy, such as a property name and object name and/or location. The information specified in the token may be used to determine what information is responsive to the query and whether the requestor (e.g., user, audience or service) may access the requested information.

The method 800, at block 820 includes determining that the property is located in a restricted visibility location in a storage layer of the knowledge-graph object. Determining that the property has restricted visibility may comprises determining the property is stored in a portion of the object storage layer designated for restricted properties. In an aspect, properties not associated with the restricted properties are not restricted and are stored separately.

The method 800, at block 830 includes determining that the requestor has visibility to the property from a visibility policy stored in the storage layer of the knowledge-graph object.

The method 800, at block 840 includes outputting the property to the requestor. Outputting the property can be performed in a variety of manners that are adapted to the application that requested the property. In one aspect, the property is provided through an application program interface to the knowledge graph.

Exemplary Operating Environment

Figure 9:
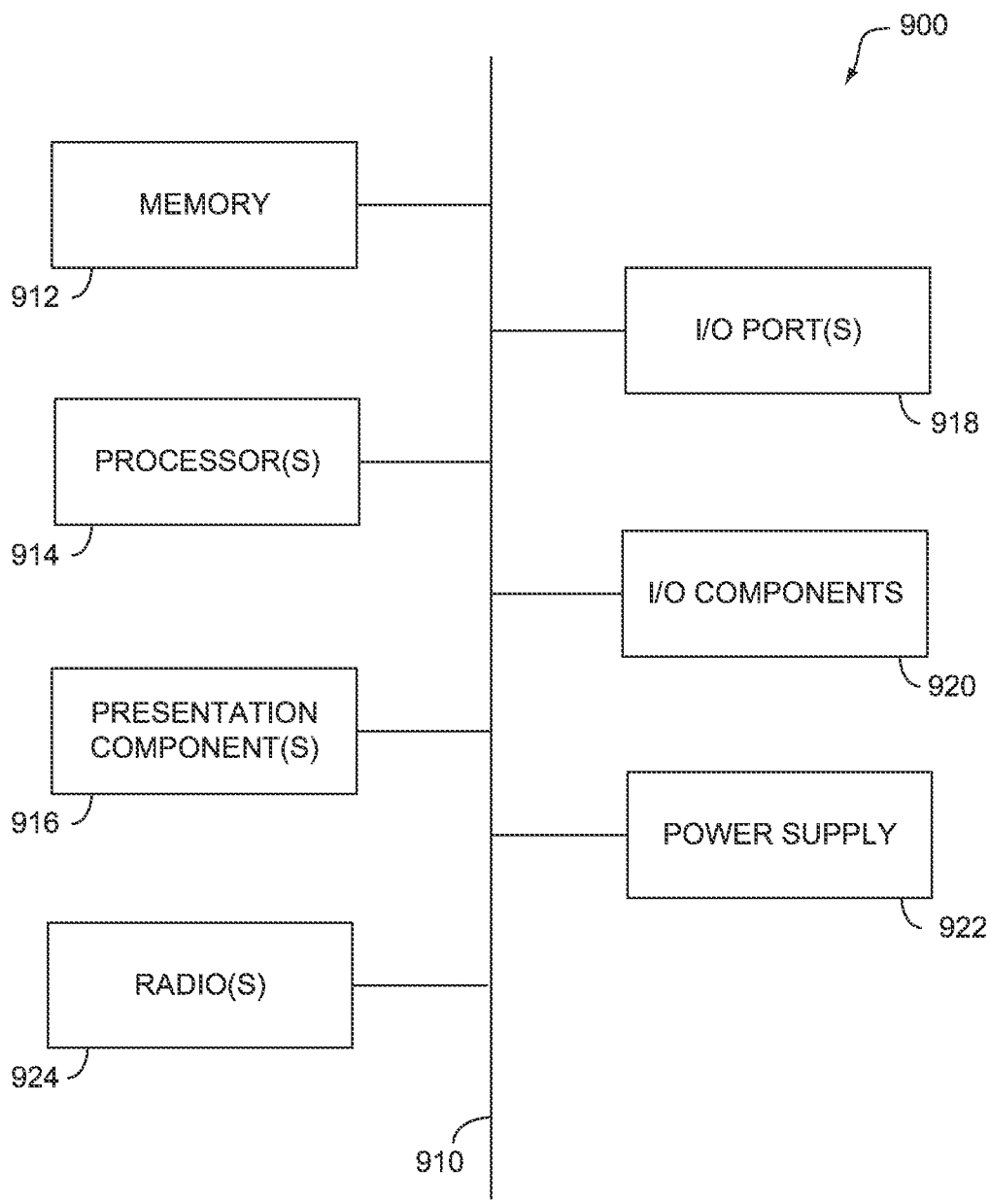
FIG. 9 is a block diagram of an exemplary computing environment suitable for use in implementing aspects of the technology described herein.

Referring to the drawings in general, and initially to FIG. 9 in particular, an exemplary operating environment for implementing aspects of the technology described herein is shown and designated generally as computing device 900. Computing device 900 is but one example of a suitable computing environment and is not intended to suggest any limitation as to the scope of use of the technology described herein. Neither should the computing device 900 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. The technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 9, computing device 900 includes a bus 910 that directly or indirectly couples the following devices: memory 912, one or more processors 914, one or more presentation components 916, input/output (I/O) ports 918, I/O components 920, and an illustrative power supply 922. Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 9 is merely illustrative of an exemplary computing device that may be used in connection with one or more aspects of the technology described herein. Distinction is not made between such categories as "workstation," "server," "laptop," "handheld device," etc., as all are contemplated within the scope of FIG. 9 and refer to "computer" or "computing device."

Computing device 900 typically includes a variety of computer-readable media. Computer-readable media may be any available media that may be accessed by computing device 900 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory 912 may be removable, non-removable, or a combination thereof. Exemplary memory includes solid-state memory, hard drives, optical-disc drives, etc. Computing device 900 includes one or more processors 914 that read data from various entities such as bus 910, memory 912, or I/O components 920. Presentation component(s) 916 present data indications to a user or other device. Exemplary presentation components 916 include a display device, speaker, printing component, vibrating component, etc. I/O ports 918 allow computing device 900 to be logically coupled to other devices, including I/O components 920, some of which may be built in.

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 914 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technology described herein.

An NUI processes air gestures, voice, or other physiological inputs generated by a user. Appropriate NUI inputs may be interpreted as ink strokes for presentation in association with the computing device 900. These requests may be transmitted to the appropriate network element for further processing. An NUI implements any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

A computing device may include a radio 924. The radio 924 transmits and receives radio communications. The computing device may be a wireless terminal adapted to receive communications and media over various wireless networks. Computing device 900 may communicate via wireless policies, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 policies.

Embodiments

The technology described herein has been described in relation to particular aspects, which are intended in all respects to be illustrative rather than restrictive. While the technology described herein is susceptible to various modifications and alternative constructions, certain illustrated aspects thereof are shown in the drawings and have been described above in detail. It should be understood, however, that there is no intention to limit the technology described herein to the specific forms disclosed, but on the contrary, the intention is to cover all modifications, alternative constructions, and equivalents falling within the spirit and scope of the technology described herein.

What is claimed is:

1. One or more non-transitory computer storage media comprising computer-executable instructions that when executed by a computing device cause the computing device to perform a method of enforcing a visibility policy on property information output from a knowledge graph, comprising:
receiving a request for multiple properties stored in a knowledge-graph object, the request associated with a requestor;
determining that a subset of the multiple properties have restricted visibility;
adding a representation of each requested property in the subset the property to a property-requested record;
determining whether the requestor has access to each individual property of the subset based, at least in part, on an evaluation of each individual property in the subset against a first visibility record of the knowledge-graph object;
in response to determining that the first visibility record grants the requestor visibility to a first property in the subset, removing the representation of the first property from the property-requested record and adding the representation of the first property to a property-granted record; and
querying the knowledge-graph object for a set of properties listed in the property-granted record; and
outputting each property in the property-granted record to the requestor.

2. The media of claim 1, wherein a storage layer of the knowledge-graph object comprises a first partition for restricted-visibility properties, a second partition for unrestricted-visibility properties, and a third partition for a visibility record.

3. The media of claim 2, wherein the determining that the first property has restricted visibility comprises determining that the first property is in the first partition.

4. The media of claim 2, wherein the determining that the first property has restricted visibility comprises determining that the first property is not in the second partition.

5. The media of claim 2, wherein the determining that the requestor is authorized to have visibility to the first property is based on the visibility record.

6. The media of claim 1, wherein the knowledge-graph object is a node associated with a user profile.

7. The media of claim 6, wherein the first property is selected from a group consisting of a work email, a personal email, a work telephone number, a personal telephone number, a job title, and an office location.

8. A method of enforcing a visibility policy on property information output from a knowledge graph, the method comprising:
receiving a visibility instruction for a knowledge-graph object, the visibility instruction specifying a visibility restriction for a first property of the knowledge-graph object;
moving the first property of the knowledge-graph object to a restricted visibility location in a storage layer of the knowledge-graph object;
storing a second property of the knowledge-graph object in an unrestricted visibility location in the storage layer of the knowledge-graph object;
storing a visibility policy in the storage layer of the knowledge-graph object, the visibility policy designating a first user with permission to access the first property; and
receiving a request from a second user to access the first property and the second property of the knowledge-graph object;
determining whether the second user has access to the first property and the second property based at least in part on an evaluation of the first property and the second property against the visibility policy stored within the knowledge-graph object;
in response to determining that the visibility policy does not grant the second user visibility to the first property, granting the second user access to the second property in the unrestricted visibility location while denying the second user access to the first property.

9. The method of claim 8, wherein the visibility policy comprises offsets corresponding to properties in the restricted visibility location that the first user has permission to access.

10. The method of claim 8, wherein the visibility policy comprises offsets corresponding to properties in the restricted visibility location that a group has permission to access.

11. The method of claim 8, further comprising:
receiving a second request for the first property of the knowledge-graph object, the second request associated with a requestor;
determining that the first property is located in the restricted visibility location;
adding a representation of the first property to a property-requested record;
determining, from the visibility policy, that the requestor has visibility to the first property;
removing the representation of the first property from the property-requested record;
adding the representation of the first property to a property-granted record; and
outputting the first property to the requestor.

12. The method of claim 8, wherein the wherein the visibility policy comprises offsets corresponding to properties in the restricted visibility location that a group does not have permission to access.

13. The method of claim 8, further comprising:
receiving a third request for the second property of the knowledge-graph object, the request associated with a requestor;
determining that the second property is located in the unrestricted visibility location; and
outputting the second property to the requestor without interrogating the visibility policy.

14. The method of claim 8, wherein the knowledge-graph object is a node associated with a user profile.

15. The method of claim 14, wherein the visibility instruction is provided by the first user.

16. A method of enforcing a visibility policy on property information output from a knowledge graph, comprising:
- receiving a request for multiple properties stored in a knowledge-graph object, the request associated with a requestor;
- determining that a subset of the multiple properties are located in a restricted visibility location in a storage layer of the knowledge-graph object;
- adding a representation of the multiple properties in the subset to a property-requested record;
- determining whether the requestor has access to each individual property of the subset based, at least in part, on an evaluation of each individual property in the subset against a visibility policy stored in the storage layer of the knowledge-graph object;
- in response to determining, based on the visibility policy, that the requestor has visibility to a first property of the multiple properties, removing the representation of the first property from the property-requested record and adding the representation to a property-granted record;
- querying the knowledge-graph object for properties listed in the property-granted record; and
- outputting the properties in the property-granted record to the requestor.

17. The method of claim 16, further comprising:
- adding a representation of the first property to a property-requested record;
- removing the representation of the first property from the property-requested record upon determining that the requestor has visibility to the first property; and
- adding the representation of the first property to a property-granted record.

18. The method of claim 16, wherein the requestor has visibility to the first property through membership in a group that has visibility to the first property.

19. The method of claim 16, wherein the method further comprises:
- receiving a second request for a second property of the knowledge-graph object, the request associated with the requestor;
- determining that the second property is located in the restricted visibility location in the storage layer of the knowledge-graph object;
- adding a representation of the second property to a property-requested record;
- determining that the requestor does not have visibility to the first property from the visibility policy stored in the storage layer of the knowledge-graph object; and
- leaving the representation of the second property in the property-requested record.

20. The method of claim 16, wherein the knowledge-graph object is a node associated with a user profile.

* * * * *